Oct. 18, 1932.  W. E. BIHL  1,883,329
REFRIGERATOR
Filed Dec. 9, 1929   3 Sheets-Sheet 1

Inventor
William E. Bihl
By Brown, Jackson, Boettcher & Dienner
Attys

Oct. 18, 1932.  W. E. BIHL  1,883,329
REFRIGERATOR
Filed Dec. 9, 1929  3 Sheets-Sheet 2

Inventor
William E. Bihl
By Brown, Jackson, Boettcher
& Dienner
Attys

Oct. 18, 1932.  W. E. BIHL  1,883,329
REFRIGERATOR
Filed Dec. 9, 1929  3 Sheets-Sheet 3

Inventor
William E. Bihl
By Brown, Jackson, Boettcher & Dienner
Attys

Patented Oct. 18, 1932

1,883,329

UNITED STATES PATENT OFFICE

WILLIAM E. BIHL, OF CHICAGO, ILLINOIS, ASSIGNOR, BY MESNE ASSIGNMENTS, TO ZEROZONE, INCORPORATED, OF CHICAGO, ILLINOIS, A CORPORATION OF DELAWARE

REFRIGERATOR

Application filed December 9, 1929. Serial No. 412,730.

This invention relates to refrigerators, more particularly to mechanical refrigerators for preserving produce in a frozen condition.

In the marketing of fish, it has long been recognized that because of the rapidity at which the fish spoil, the most practical way of insuring that an edible product will be placed in the hands of the consumer is by freezing the fish as soon as possible after they have been caught and dressed. The practice of handling fish has developed so that as soon as the fresh fish have been cleaned they are split and laid out flat and frozen in this flat condition. The frozen fish are then transported to the retail merchant in this frozen condition, and heretofore the only weak link in the chain has been in the retail store where no adequate equipment was available for maintaining the fish in a frozen condition.

In my present invention I have provided a mechanical refrigerator adapted for the storing of frozen fish in a retail merchant's establishment, a refrigerator which maintains the fish firmly frozen so that they will be preserved in an edible condition while in the hands of the retail merchant. Experience has taught that if the retailer maintains the fish frozen, there is little likelihood of their thawing out and becoming inedible during the short interval that elapses between the time that the consumer removes the fish from the retailer's establishment and prepares it for cooking. The improved refrigerator of my invention, therefore, completes the chain and insures that the produce will be maintained in a perfect condition up to the time that it passes into the hands of the consumer.

In handling fish in this manner it is the practice to split them and lay them out flat so that when frozen they present a board-like appearance and in the design of a refrigerator for storing fish of this kind, I have provided within the cooling chamber an arrangement of removable grills or racks, which divide the cooling chamber into a plurality of sub-chambers, each of which is disposed vertically, so that the flat frozen fish may be stacked up in the sub-chambers in a manner which is economical of space within the cooling chamber and convenient in its manipulation.

In the preferred embodiment of my invention, a mechanical evaporator or cooling unit is disposed at the top of the cooling chamber, as is the custom in mechanical refrigerators of this kind. Owing to the low temperature at which this cooling unit is maintained, the moisture in the cooling chamber will collect on it in the form of frost and, as is the custom in devices of this kind, I have provided a drip pan disposed below the cooling unit to catch the water which drips from it when its temperature rises sufficiently to permit this frost to melt.

However, in a refrigerator designed for this particular use, it is necessary that the entire storage chamber be maintained below freezing point, and if a drip pan of the ordinary kind were installed in such a refrigerator, it would block the free circulation of air therein sufficiently to make it difficult to maintain the entire box at the required low temperature. I have, therefore, as a further object of my invention provided a new and improved drip pan which effectively catches whatever water drips off of the cooling unit of the refrigerator and at the same time permits a free flow of air through the pan and around the cooling unit so that no difficulty is experienced in maintaining the cooling chamber at the required low temperature.

Fish are odoriferous even when frozen, and if the refrigerator is to be maintained in a sanitary condition it must frequently be thoroughly cleaned. To facilitate this cleaning, I have arranged the grilles within the cooling chamber in such a manner that they can be entirely removed therefrom so that the walls and floor of that chamber can be thoroughly scrubbed and made sanitary. To permit the wash-water so employed to be readily drained from the chamber, I have provided as a further object of my invention a new and improved trap or drain which, when closed, tightly seals the chamber and prevents the escape of chilled air from it, and which when open permits the ready flow of the wash-water from the cooling chamber.

Now to acquaint those skilled in the art with the teachings of my invention, reference is made to the accompanying drawings in which a preferred embodiment of it is shown by way of example only, and in which.

Figure 1:
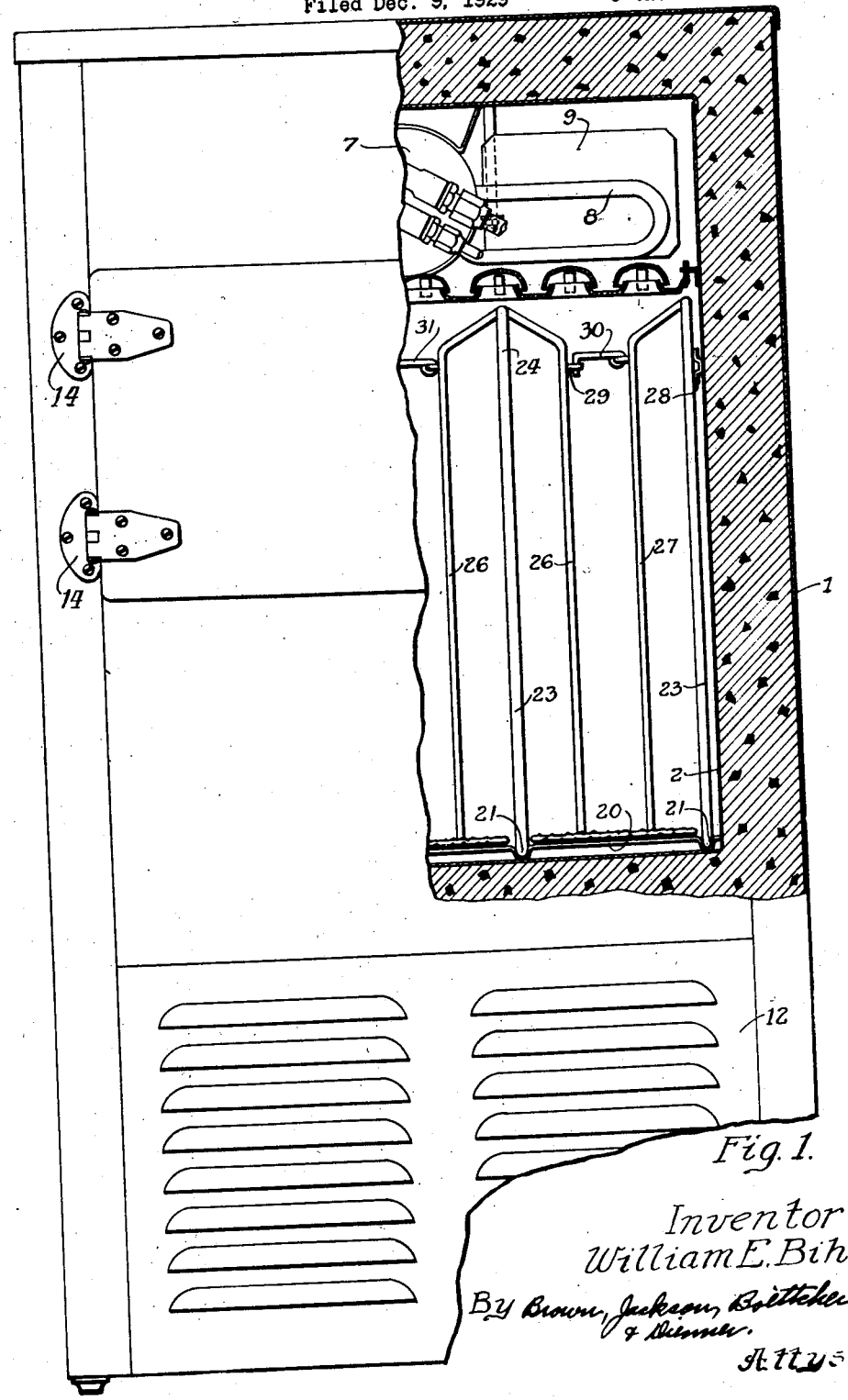
Figure 1 is a front elevational view of my refrigerator, partly broken away to show its interior construction.

Referring to the drawings in more detail, the refrigerator comprises an outside casing 1 and an inside casing 2 with a suitable insulating material 3 interposed between the two casings. In the preferred embodiment, both the inside and the outside casings are sheet metal enamel surfaced casings and the insulating material 3 is a combination of sheet insulation and ground insulation, the sheet being used where the space is regular and the ground insulation where it is irregular.

The inside casing 2 forms the outer boundaries of the cooling chamber 4, in the top of which the evaporator or cooling unit 5 is suspended by suitable straps 6 extending through the upper wall of the chamber 2. As shown, the cooling unit 5 comprises a horizontal cylinder 7 from which are extended a plurality of horizontally disposed circulating coils 8, each coil having a metallic vane 9 in good thermal contact with it and disposed in a vertical plane to increase the heat-collecting area of the coil and to direct the passage of air downward through it.

The specific type of horizontal cylinder 7 and coils 8 and vanes 9 may be modified within the teachings of my invention, the particular form shown being shown by way of example only. Preferably the cylinder 7 is constructed of brass and the circulating coils 8 and the vanes 9 are of copper, although other material may be substituted therefor.

The bottom wall 10 of the inside casing 2 and the partition wall 11, located beneath it, divides the outer cabinet 1 into two compartments, and the lower one 12 of these compartments houses the compressor unit used to withdraw vapor refrigerant from the cooling unit 5 within the cooling chamber. The compressor unit is not shown in the drawings since it is not of the essence of the present invention. The compressor is connected to the cooling unit 5 by pipes, not shown, preferably located between the walls 1 and 2.

The cooling chamber 4 is reached through a door 13 which is preferably constructed in the same manner as the walls of the refrigerator so that it effectively blocks the entrance of warm air into the cooling chamber. This door is hung on hinges 14 and latched by a refrigerator latch, not shown, so that when it is closed it virtually seals the cooling chamber 4 air-tight.

In a mechanical refrigerator of this kind, it is customary to provide a drip-pan beneath the cooling unit, that pan serving to prevent the free motion of air inside the cooling chamber and to collect the water that drips off of the cooling unit during a defrosting period. Ordinarily it is not desired that the cooling chamber be maintained at a temperature lower than freezing, and therefore a solid drip-pan is employed, since such a pan retards the free movement of air in the chamber sufficiently to prevent lowering it to the freezing point.

However, in a refrigerator designed to maintain the cooling chamber below the freezing point, this retarding of the movement of air by a drip pan is a hindrance rather than an advantage and I have, therefore provided a special type of drip pan which collects the water that drips from the cooling unit without preventing the free flow of air through the chamber. To this end, I have provided a metallic relatively flat pan 15 in the surface of which I have upraised a plurality of flanged openings 16, the flanges being bent upward sufficiently to form a retaining wall to prevent water that has collected on the pan from falling through the openings. A cap 17 is supported over the top of each opening 16 and prevents a drop of water that falls off of the cooling unit from falling through the opening into the lower part of the chamber.

The pan 15 is supported by suitable brackets 18 with its rear edge lower than its front edge so that water drains toward the back of the cabinet. If desired a suitable pipe may be employed to conduct the water that collected out of the cooling chamber, however, I have found that this is not necessary and the water may be allowed to drop along the back wall of the chamber into the bottom of it.

The retail merchant receives the fish that are to be stored in such refrigerator in a frozen condition, those fish being laid out flat before they are frozen at the packing plant. The most convenient way to store such an article is in a pile with the broad side of the article laid flat and I have therefore provided a grille or rack within the cooling chamber which divides said chamber into a plurality of sub-chambers each extending vertically and of such size as to permit laying the frozen fish flat in it. Each of the stacks thus formed is supported by vertical grilles on its opposite sides, and as many different kinds of fish can be stored in the cabinet as there are different sub-departments without making it necessary to handle the fish in one pile to reach those in another.

In carrying out a preferred embodiment of this rack, I provide cross strips 20 in the bottom of the cooling chamber, these sub-strips are being provided with a plurality of transverse grooves 21 and are laid one in the front and one in the rear of the cooling chamber. The separating grilles which define the limits of the sub-compartments of the cooling chamber comprise a horizontal rod 22 laid in the grooves 21 and a plurality of vertical rods 23 disposed parallel to each other and attached to the horizontal rod 22. The upper ends of the vertical rods 23 are attached to a second horizontal rod 24 and to an inclined portion 25 of this rod, such attachment being preferably made by welding. At the back side of the grille I provide a U-shaped rod 26 which is attached to the upper horizontal rod 24 at its upper end and extends downward to the bottom of the chamber. This U-shaped rod 26 forms a back wall of the sub-compartment and assists in maintaining the grille in an upright position.

The grilles at the outer edge of the compartment, that is adjacent the walls 2 of the compartment, are formed in a similar manner, except that one half of the U-shaped bracket 27 is omitted and a bumper plate 28 is added to bear against the wall of the compartment and maintain the grille in an upright position.

On the intermediate grille, I have provided an eyelet 29 and on the adjacent end grille a hook 30 adapted to engage this eyelet and hook these two grilles together. On the opposite side of the intermediate grille is provided a hook 31 which engages an eyelet 32 in the adjacent grille 33 and that grille in turn is provided with a hook 34 which engages the eyelet 35 in the end grille 36. The end grille 36 is also provided with bumpers 28 which bear against the inside surface of the chamber to maintain the grille in an upright position.

By this arrangement, the interior of the cooling chamber is divided into three compartments, 37, 38 and 39, by the two intermediate grilles 33 and 40, and those grilles and the end grilles 36 and 41 are all removable through the simple expedient of unhooking the hooks 30, 31 and 34 from their corresponding eyelets and removing the released grilles from the chamber. The cross strips 20 may be lifted out after the grilles have been removed thereby leaving the interior walls of the cooling chamber exposed for cleaning.

In cleaning the interior chamber of a refrigerator of this type, it is preferable that cleaning water be freely used and it is, therefore, necessary to provide a convenient drain for draining this water from the bottom of the chamber.

When the refrigerator is in operation it is also important that this drain be sealed off air-tight, so that the cooled air in the chamber cannot escape from the refrigerator through the drain pipe.

To this end, I have provided a drain pipe 50 extending downward out of the bottom of the cooling chamber and terminating in a cup-like sealing member 51 in which member an opening 52 is eccentrically disposed with respect to the outside wall of the cup. The pipe 50 fits against a solid bottom wall 53 which is threaded into the supporting collar 54 to hold the sealing collar in place therein. The supporting collar 54 may be attached to the bottom member 11 of the cooling chamber by screws, bolts or in any other preferred manner.

Figure 2:
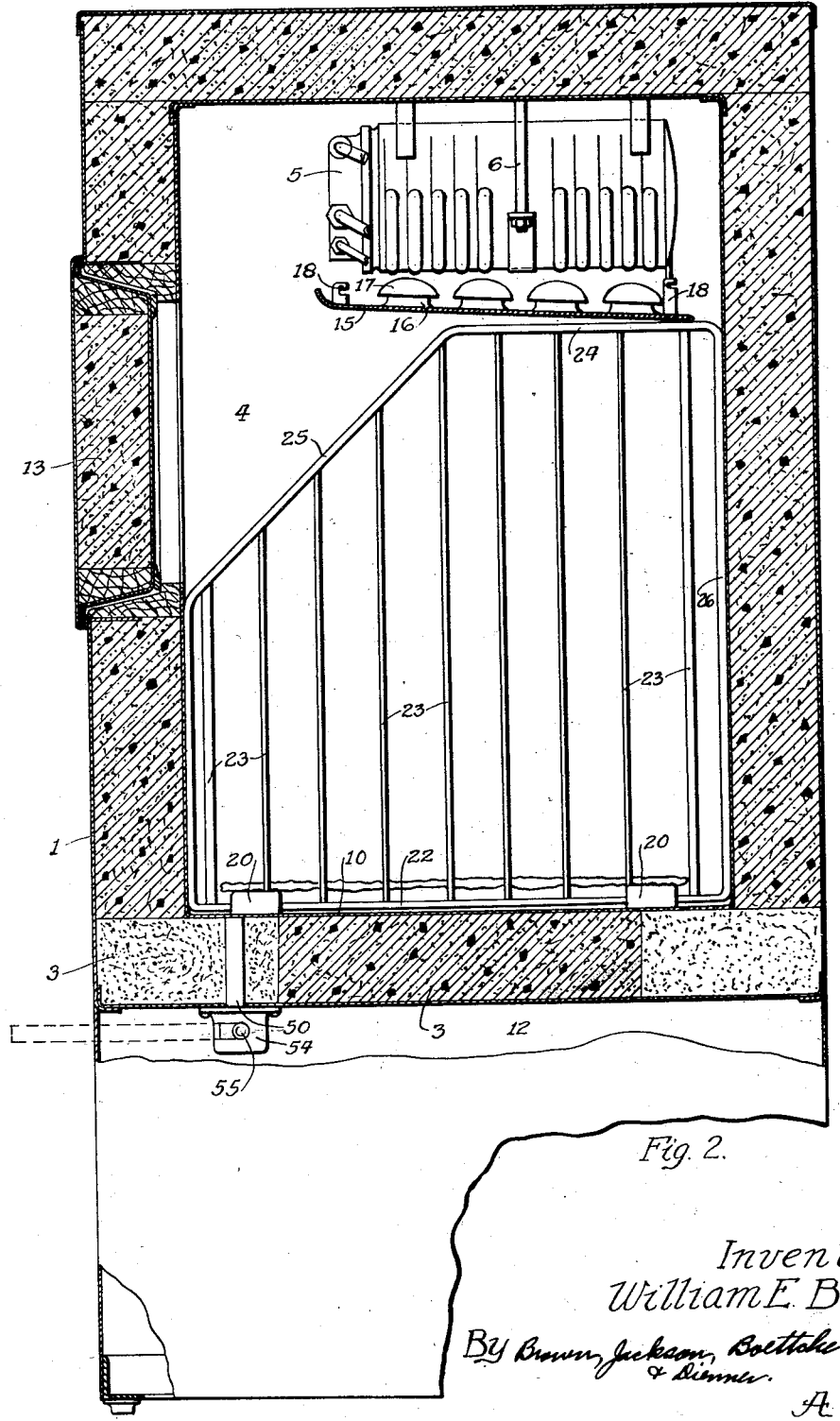
Figure 2 is a side elevational view of the refrigerator also broken away to show its interior construction.
Figures 4, 5:
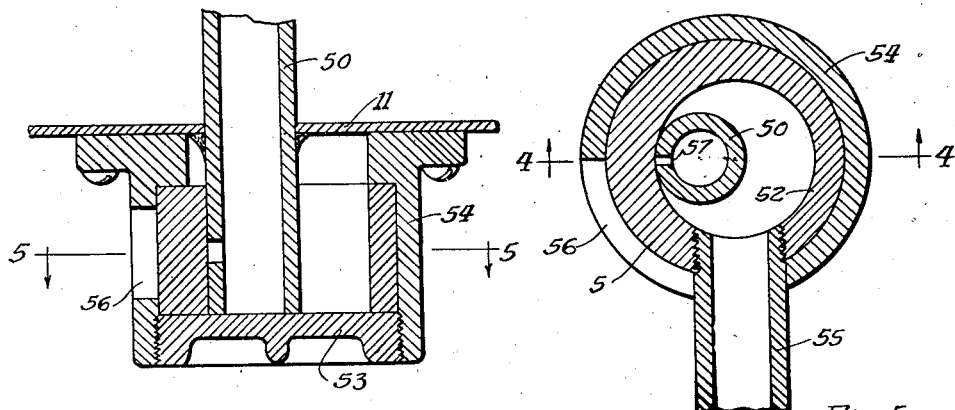
Figure 4 is an elevational view in cross-section taken along the line 4—4 of Figure 5.
Figure 5 is a cross-sectional plan view taken along the line 5—5 of Figure 4.
Figure 3:
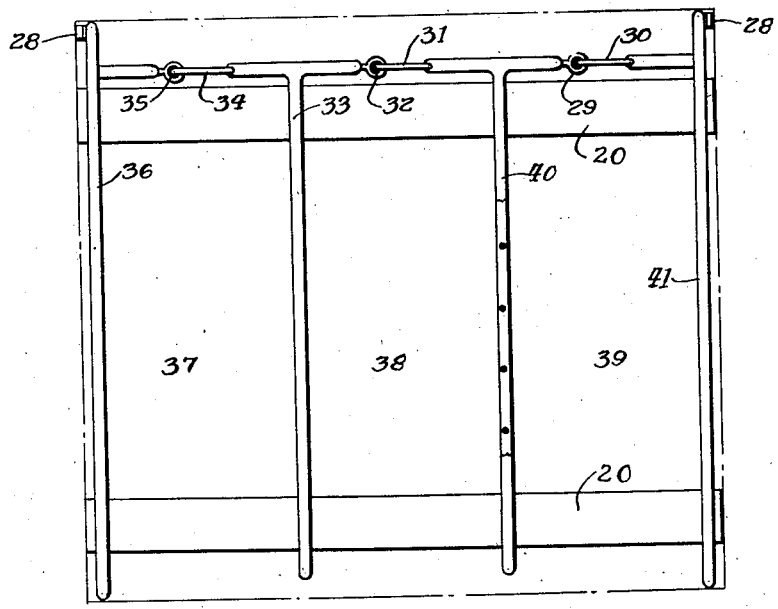
Figure 3 is a plan view of the grille used to divide the cooling chamber into sub-chambers.

The sealing collar 51 is provided with an outlet pipe 55 which projects through a slot 56, that slot extending approximately a quarter of the way around the supporting collar 54. When the pipe 55 is rotated to the position in which it is shown in Figure 2, the eccentric interior wall of the sealing collar 51 bears against the drain pipe 50 to seal the opening 57 in that pipe. Sealing of the opening 57 virtually blocks the flow of air out of the cooling chamber 4.

When it is desired to drain water out of the cooling chamber, the pipe 55 is rotated a quarter of a turn to the dotted position, Figure 2, thereby moving the eccentric interior wall away from the opening 57 and permitting the flow of the water from the pipe 50 through the sealing chamber 52 to the drain pipe 55, by which it is removed from the refrigerator.

This sealing arrangement, while it is simple and inexpensive to manufacture, is sufficiently rugged to be lasting and is effective to seal the cooling member when it is desired to do so.

Having thus complied with the statutes and shown and described a preferred embodiment of my invention, what I consider new and desire to have protected by Letters Patent is pointed out in the appended claims.

What is claimed is:—

1. In a refrigerator, a cooling unit, a removable drip pan disposed below said unit and inclined with respect to it, means on one end of said pan and engaging said unit to hang the pan therefrom, means for supporting the other end of the pan, and means in said pan for permitting a free flow of chilled air downward from said unit.

2. In a refrigerator, a cooling unit, a removable drip pan hung below said unit and having a plurality of openings to permit a free flow of air through said pan, flanges upturned at the edges of said openings to prevent the flow of water therethrough, and covers supported by said flanges above the openings to prevent the dropping of water therethrough.

3. In a refrigerator the combination with a cooling unit of a removable unitary drip pan hung underneath said unit for collecting drops of water falling from it and a plurality of mushroom vents in said pan for permitting a free flow of air through the pan.

4. In a refrigerator for preserving frozen produce, a closed chamber bounded by smooth non-absorbent walls which are surrounded by a heat insulating material, a cooling unit disposed at the top of said chamber, removable metallic rails resting on the bottom of said chamber and a plurality of vertically disposed removable metallic grilles resting on said rails and dividing the space between them and said unit into a plurality of sub-chambers.

5. In a refrigerator for preserving frozen produce, a closed chamber bounded by smooth metallic walls which are surrounded by a heat insulating material, a cooling unit disposed at the top of said chamber, removable metallic rails resting on the bottom of said chamber and a plurality of vertically disposed removable grilles resting on said rails and dividing the space between them and said unit into a plurality of vertically disposed sub-chambers.

6. In a refrigerator for preserving frozen produce, a closed smooth walled chamber surrounded by a heat insulating material, a cooling unit disposed at the top of said chamber, removable metallic rails resting on the bottom of said chamber, a plurality of grooves in said rails extending from their front to their back edges, and a plurality of grilles each having a horizontal member resting in one set of said grooves and a plurality of parallel vertical members for dividing said chamber into a plurality of vertical sub-chambers.

7. In a refrigerator for preserving frozen produce, a smooth walled closed chamber surrounded by a heat insulating material, a cooling unit disposed at the top of said chamber and arranged to maintain said chamber at a temperature below freezing, removable rails in the bottom of said chamber, a plurality of grooves in said rails extending from their front to their back edges, a plurality of grilles each having a horizontal member resting in one set of said grooves and a plurality of parallel vertical members for dividing said chamber into a plurality of vertical sub-chambers, and means on each of said grilles for attaching it to the adjacent grille.

8. In a refrigerator for preserving frozen produce, a grille for dividing a refrigerating chamber into a plurality of sub-chambers, said grille comprising a horizontal rod, a plurality of parallel vertical rods attached to said horizontal rod, a pair of parallel vertical rods joined together at their top ends and disposed vertically in a plane at right angles to the plane of said parallel rods and a top rod joining the top ends of said vertical rods.

9. In a refrigerator for preserving flat frozen produce in vertical piles, a metallic grille for maintaining said piles upright, said grille including a plurality of smooth parallel rods vertically disposed.

In witness whereof, I hereunto subscribe my name this 6th day of December, 1929.

WILLIAM E. BIHL.